Sept. 3, 1940. A. C. HOECKER 2,213,840
COMBINED JACK AND BUMPER FOR AUTOMOBILES
Filed Feb. 20, 1935 2 Sheets-Sheet 1

INVENTOR.
Albert C. Hoecker.

Sept. 3, 1940.  A. C. HOECKER  2,213,840
COMBINED JACK AND BUMPER FOR AUTOMOBILES
Filed Feb. 20, 1935  2 Sheets-Sheet 2
FIG. 6.
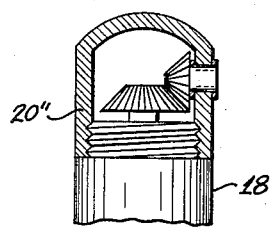
FIG. 8.
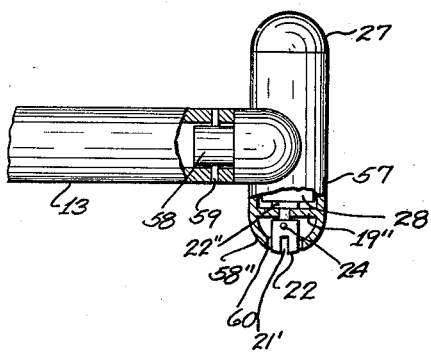
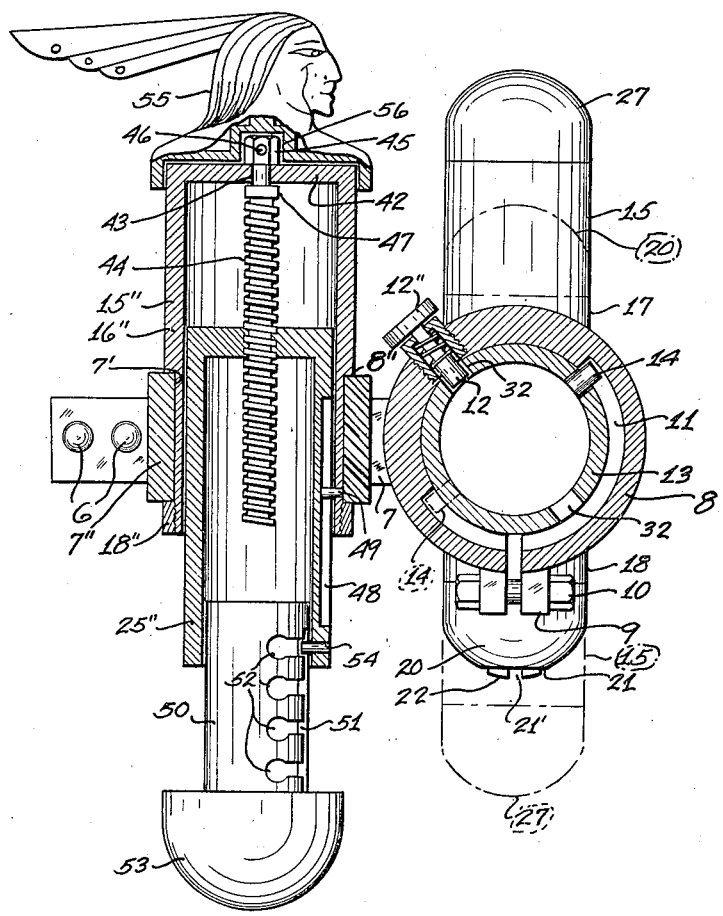
FIG. 7.
INVENTOR.
Albert C. Hoecker.

Patented Sept. 3, 1940

2,213,840

UNITED STATES PATENT OFFICE 2,213,840

COMBINED JACK AND BUMPER FOR AUTOMOBILES

Albert C. Hoecker, St. Louis, Mo.

Application February 20, 1935, Serial No. 7,394

15 Claims. (Cl. 293—55)

This invention relates to certain new and useful improvements in a combined jack and bumper for automobiles, this application being a furthering of the subject matter presented in my Patent No. 1,737,720 granted December 3, 1929.

The primary object of the invention is to simplify the invention disclosed in my prior Patent No. 1,737,720.

Another object of the invention is to provide the jack with an ornamental wrench or head.

Another object of the invention is in providing a combined jack and bumper with an improved impact member.

Another object of the invention is to provide the vehicle with an improved bumper supporting arm.

Other and further objects will appear in the specification and be specifically pointed out in the appended claims, reference being had to the accompanying drawings, exemplifying the invention, and in which:

Fig. 6 is an enlarged view of a gear box and gears for operating the jack.

Figs. 7 and 8 are modifications of the different ways of mounting the jacks on a vehicle.

Figure 1:
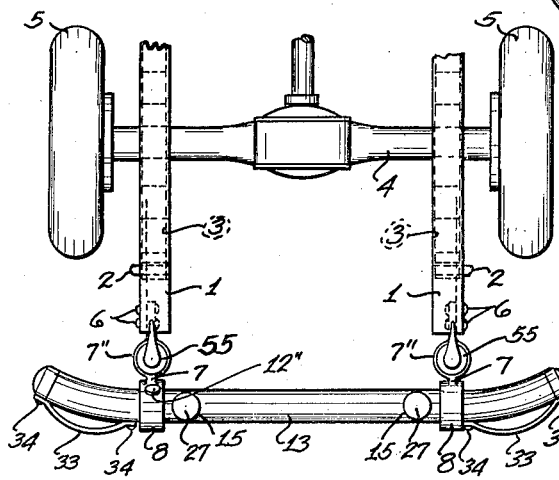
Fig. 1 is a fragmentary plan view of the rear portion of an automobile showing the combined jack and bumper attached thereto.

Referring by numerals to the accompanying drawings, 1 designates the side frames of the vehicle chassis and secured to the rear end of each frame by a bolt 2 is a rear spring 3, said springs being mounted on the rear axle housing 4.

The disclosure of this improved combined jack and bumper is shown as applied to the rear end of the vehicle or automobile, although the application thereof can be to the front of the vehicle as well.

The wheels 5 of the vehicle are supported from the axle 4 in the usual manner and extending forwardly from each frame 1 and secured thereto by bolts or rivets 6 is a bumper supporting arm 7. The forwardly extending end of each arm 7 is formed into a bearing 8, said bearings being slotted and having ears 9 formed thereon, extending through said ears are bolts 10. Extending approximately half way around the inner circumference of said bearings are grooves 11 and in one of said bearings is a spring plunger 12, and mounted in said bearings is a bumper 13.

The bumper 13 is of tubular construction and is provided with a pair of stop pins 14, said pins are adapted to turn with the bumper 13 in the grooves 11 of the bearings 8 for stopping said bumper in different positions. The bumper is further provided with openings 14'' for the reception of jacks 15. The lifting jacks comprise tubular lengths 16 threaded at one end, and mounted over said lengths are tapered jaw sleeves 17. The tubular lengths 16 extend through the openings 14'', tapered jaw sleeves 18 are loosely fitted over the lower part of each of said tubular lengths 16, a washer 19 is placed over the ends of the tubular lengths 16, a cap 20 is mounted over the washer 19 and screwed to the tubular length 16 locking said tubular length 16 and washer 19 in position. The cap 20 is provided with an opening 21 which is larger than the opening in the washer 19, this opening 21 is for the reception of a knob 22, mounted in the opening of the washer 19 and cap 20 is an extending end of a telescopic screw 23'', the extending end of said screw being secured to the knob 22 by a pin 24, said knob engaging one side of the washer 19 whereas a collar 22'' on the screw 23'' engages the opposite side of said washer. Mounted within the tubular length 16 is a tubular leg 25, one end of said leg having a threaded opening 26 for the reception of the telescopic screw part 23, the other end of the leg 25 is provided with an ornamental head 27 screwed or otherwise secured thereto, mounted over the tubular leg 25 is a loosely fitted slidable sleeve 28. For preventing the tubular leg 25 and the slidable sleeve 28 from turning with the telescopic screw 23'', said leg and sleeve are provided with flat sides 29 extending up to approximately one inch from the ends thereof, the round ends limiting the travel of said sleeve and leg. The tubular length 16 also has a flattened portion 30 for preventing said sleeve and leg from turning and from being forced out of the tubular length 16 when the tubular leg 25 reaches its lowest point of travel. The knob 22 is provided with an opening 22' for the reception of an operating wrench 31. I do not want to be limited to this particular structure however, as a gear may be mounted on the end of the screw 23″ and in the cap 20″ as shown in Fig. 6. The bumper 13 is provided with a pair of openings 32 for the reception of the spring locking plunger 12. The bumper 13 is further provided with an impact member 33 which is bolted to the bumper 13 by bolts 34.

Figure 2:
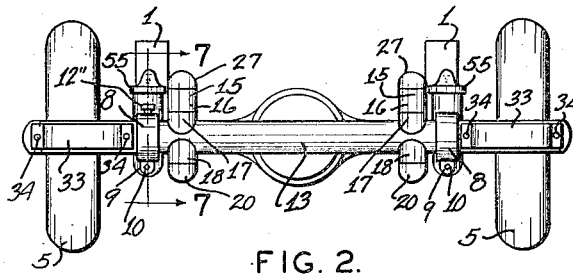
Fig. 2 is a front view of Fig. 1 showing the jacks in a running position.

When the vehicle equipped with this improved combined jack and bumper is traveling, the tubular lengths 16 are in a vertical position as shown in Figs. 1 and 2. When the jacks 15 are held in a vertical position during the travel of the vehicle the stop pins 14 engage the upper ends of the grooves 11 and the plunger 12 is in one of the openings 32, locking the jack in a vertical position.

Figure 3:
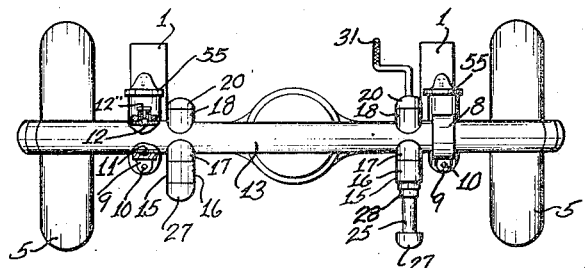
Fig. 3 is a view of one of the jacks in a lifting position, and one of the bearings in section showing the bumper locked by the spring plunger.
Figure 5:
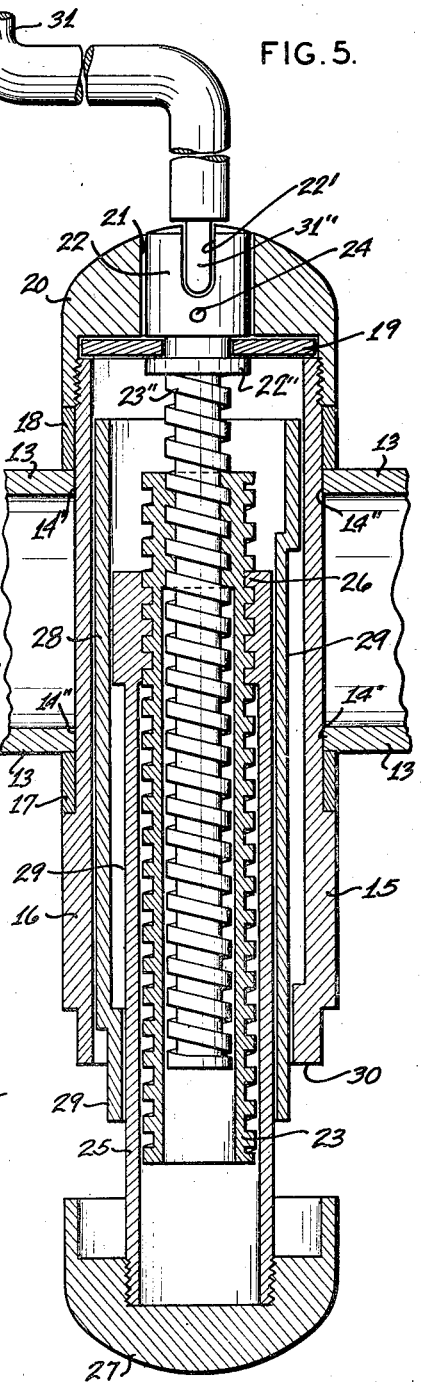
Fig. 5 is an enlarged vertical section of the bumper jack.

To operate the jacks 15 for changing tires or making other repairs, the knob 12″ on the plunger 12 is pulled outwardly by the operator until the plunger 12 disengages the opening 32 in the bumper bar 13. The operator holds the plunger 12 out of the opening 32 with one hand and grasps one of the jacks 15 with the other hand thereby pulling the jack forwardly, thus turning the bumper 13; as soon as the opening in the bumper 13 passes the plunger 12 the operator releases the knob 12″ on the plunger 12 allowing the plunger to ride on the outer periphery of the bumper 13 at the same time the operator continues to pull the jack forwardly and downwardly until the jacks 15 again assume a vertical position. When the bumper 13 is in this position, the stop pin 14 which is clearly shown in Fig. 7 engages the other end of the groove 11 and the spring plunger 12 drops in the other opening 32 thus locking the bumper in operative position for raising the vehicle as shown in Figs. 3 and 7. In this position the knob 22 will be uppermost and the polygonal end 31″ of the wrench 31 can be engaged in the opening 22′ in the knob 22 as shown in Figs. 3 and 5. When the jacks 15 are in the position shown in Fig. 3, the jacks are ready to be operated downwardly and by reason of the screw 23″ having a left hand thread, the wrench 31 when turned in a right hand direction will cause the telescopic screw 23″ to force the tubular leg 25 and the slidable sleeve 28 downwardly, forcing the ornamental head 27 against the roadway thus raising the vehicle so that repairs to tires or other parts can be made.

After repairing a tire or other parts of the vehicle, the wrench 31 is manipulated so as to draw the tubular leg 25 and slidable sleeve 28 into the tubular length 16. The spring plunger 12 is then withdrawn from the opening 32 by the operator and the bumper 13 is then turned until the tubular lengths 16 again assume a vertical position as shown in Fig. 2. The parts for locking the bumper 13 in the different positions are clearly shown in Fig. 7.

Figs. 7 and 8 are modifications of the different ways of attaching the jack to the bumper parts. One of these jacks shows a single lifting screw in place of the telescoping screw shown in Fig. 5. However, telescopic screws may be used in either jack.

Fig. 7 is an enlarged vertical section of one of the jacks mounted in one of the bumper arms 7, taken on line 7—7 of Fig. 2, but showing the modified jack in lifting position and the bumper jack locked in different positions.

The modified jack 15″ shown in Fig. 7 comprises a tubular length 16″, one end of the tubular length 16″ is turned down so as to form a shoulder 8″ and on said turned down portion is a screw thread.

Figure 4:
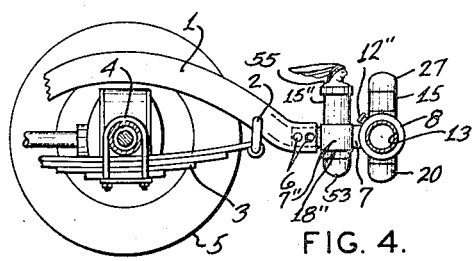
Fig. 4 is a side elevation of Figs. 1 and 2.

The tubular length 16″ is mounted in the cylindrical opening 7′ which is formed in the bumper arm 7 so that the shoulder 8″ on the tubular length engages one end of the cylindrical member 7″ whereas a screw threaded sleeve 18″ is screwed on the threaded portion of the tubular length for securing the jack 15″ in position. The top of the tubular length 16″ is provided with a shoulder 42 and formed in said shoulder is a bearing 43 and mounted in said bearing is an extended end of a screw 44, the extending end of said screw is secured to a hexagon nut 45 by a pin 46, said nut engaging one side of the shoulder 42 whereas a collar 47 on the screw 44 engages the other side of said shoulder. Mounted within the tubular length 16″ is a tubular leg 25″. The tubular leg 25″ is the same as the one shown in the enlarged section Fig. 5 with the exception that the screw opening is for a single screw in place of the telescopic screw 23″ and the leg 25″ is provided with a longitudinal slot 48 in place of the flat side 29. The tubular length 16″ is provided with a pin 49 which prevents the tubular leg 25″ from turning when the tubular leg 25″ is moved longitudinally in the tubular length 16″. The jack 15″ is further provided with a third tubular leg 50, said leg is provided with a longitudinal slot 51 and a series of circumferential slots 52. The leg 50 is further fitted with a base 53, the tubular leg 25″ is provided with a pin 54, the tubular leg 50 slides longitudinally and circumferentially on the pin 54. The tubular leg 50 is adapted for quickly adjusting the jack to a lifting position. To operate the lifting jack, the leg 50 is turned until the pin 54 is in the longitudinal slot 51, the tubular leg 50 is then lowered until the base 53 of said leg engages the roadway, the leg 50 is then turned circumferentially until the pin 54 engages the closed end of one of the circumferential slots, the jack is then ready for lifting the vehicle. An ornamental Indian head wrench 55 having a socket 56 formed therein is mounted over the hexagon nut 45. After the tubular leg 50 is adjusted, the Indian head is spun around turning the screw and causing the tubular leg 50 to force the base 53 against the roadway, thus raising the vehicle. To return the jack to a normal position the Indian head or wrench is spun in a reverse direction until the base 53 disengages the roadway, the leg 50 is then turned until the pin 54 engages the longitudinal slot 51, the leg 50 is then forced up until the pin 54 is in alignment with the lowest circumferential slot, the leg 50 is then turned back until the pin again engages the end of the circumferential slot, the Indian head is then again turned until the base 53 engages the end of the tubular length 16″, thus locking the jack in normal or running position as shown in Fig. 4.

Fig. 8 shows a tubular bumper of the same construction shown in Figs. 1, 2 and 3 and operates in the bumper arm bearings 8 the same as the bumper 13, however the bumper shown in Fig. 8, is a straight bumper and does not have the rounded or curved ends shown in Figs. 1, 2 and 3 and the ends of the bumper are open for the reception of the shank 58 of the tubular T 57. One branch of the T 57 is curved so as to form the rounded end of a bumper, and the T is secured to the end of the bumper 13 by means of the shank 58 which is a part of the T 57. A pin 59 extends through the bumper and shank so as to prevent the shank from turning in the bumper. It is to be understood that the section shown in Fig. 8 is but one end of the bumper and that both ends of the bumper 13 are to be provided with a T 57. Obviously if a jack is mounted in each end of the bumper, the intermediate jacks shown in Figs. 1, 2 and 3 are to be eliminated. One end of the vertical branch of the T 57 is provided with a washer or shoulder 19" and surrounding said shoulder is a rounded cup shaped member 58" having an opening 60. The other end of the T 57 is open for the reception of the telescopic screw 23", tubular leg 25 slidable sleeve 26 and ornamental head 27. The cup-shaped member 58" is for the reception of the knob 22. The telescopic screw 23 tubular leg 25 slidable sleeve 26 ornamental head 27 and knob 22 are the same type parts shown in Fig. 5 and are inserted in the T 57 the same as shown in Fig. 5. The extending end of the telescopic screw 23" is inserted through the opening in the shoulder 19", the knob 22 is mounted over the end of the screw 23", and secured thereto by a pin 24 or by any other suitable means. In other words with the exception of the rounded cup shaped end 58" and the means of attaching the jack to the ends of the bumper the jack is almost identical to the jack shown in Fig. 5.

Various modifications may be made in this invention without departing from the spirit thereof, and therefore the exact forms shown are to be taken as illustrative only, and not in a limiting sense and it is desired that only such limitations shall be placed thereon as disclosed in the prior art.

What I claim is:

1. A lifting jack for a vehicle comprising telescopic members, one of said members having an end washer, a lifting screw mounted in said telescopic members, a cap mounted over said washer, means secured to said screw for operating said screw and means for securing said cap, washer and screw in position.

2. A lifting jack for an automobile, said jack comprising a plurality of tubular telescoping members said members having means co-operable therewith for preventing said members from turning circumferentially at any time but permitting said members to slide longitudinally, a telescopic screw for operating said members for lifting said automobile, and means on said members for securing said members to said automobile.

3. A lifting jack for an automobile comprising a plurality of reciprocating members, one of said members being connected to said automobile, a member reciprocally related to said first mentioned member and a member slidably and turnably connected to said second mentioned member for quickly adjusting the jack to a lifting position and forcing means for forcing said last mentioned member against the roadway for lifting said vehicle.

4. A lifting jack comprising a stationary member and movable members, one of which is movable within the other, forcing means cooperable with one of said movable members, and a slidable and turnable member cooperable with said movable member for quickly adjusting the jack to a lifting position.

5. A lifting device for a vehicle comprising a bumper structure having an impact member and a mounting bar, a lifting jack having a plurality of slidable cylindrical telescoping members, one of said members having a portion extending from the side thereof adapted to engage a portion of said bumper structure for holding said jack in a lifting position, and means in said telescoping members for forcing said inner telescoping members outwardly to lift said vehicle.

6. A lifting jack for a vehicle comprising a member adapted to be secured to said vehicle, a plurality of tubular members adapted to telescope within said first mentioned member, a telescopic screw for operating said tubular members, said telescopic screw and tubular members adapted to operate in automatic sequence, means for preventing said tubular members from turning circumferentially and means for operating said screw.

7. A lifting jack for a vehicle comprising tubular telescoping members, one of said members having a screw thread formed thereon, clamping members mounted on said screw threaded member adapted to grasp a part of said vehicle, a threaded nut screwed on said screw threaded member for forcing said clamping members into engagement with said vehicle part for securing said member to said vehicle, a second tubular member adapted to be projected from said first mentioned tubular member for elevating said vehicle.

8. A lifting device for a vehicle comprising supporting arms extending from said vehicle, said arms having circumferential grooves, a rail turnably mounted in said arms, means on said rail and turnable in said grooves with said rail to prevent lateral displacement of said rail, a lifting jack secured to said rail and adapted to swing to a normal or lifting position and means for holding said jack in the different positions.

9. A lifting jack adapted to be secured to a vehicle, said jack comprising a member having means for securing it to a vehicle, a plurality of reciprocating members adapted to be projected from said first mentioned member in automatic sequence, said reciprocating members forming a continuous leg and a telescopic screw for operating said reciprocating members.

10. A lifting device for a vehicle comprising an impact member, a mounting bar and a lifting jack, said jack having a pair of tapered jaws adapted to grasp said impact member and means for forcing said jaws against said member for securing said jack in position.

11. A combined jack and bumper for a vehicle, comprised of impact and mounting bar members and a lifting jack comprised of a plurality of reciprocating members, one of said reciprocating members being secured to one of said first mentioned members, a plurality of reciprocating members adapted to be projected from said jack in automatic sequence, said reciprocating member forming a continuous leg and forcing means for operating said reciprocating members.

12. A lifting jack for a vehicle, comprising a member having a tapered clamp adapted to grasp a projecting part of said vehicle, means for forcing said clamping member into engagement with said projecting part for securing said jack to said vehicle, a member adapted to be lowered from said first mentioned member and forcing means for forcing said last mentioned member against the roadway for lifting said vehicle.

13. In a vehicle having a stationary impact member and a mounting bar, a lifting jack having a member adapted to be secured to said mounting bar, a member adapted to drop down vertically from said jack member for quickly adjusting the jack to a lifting position and means for forcing said second mentioned jack member against the roadway for elevating said vehicle.

14. A lifting jack having a member adapted to engage a projecting part of a vehicle, a tubular member having a series of recesses formed thereon and movably secured to said first mentioned member and means for forcing said tubular member against the roadway for elevating said vehicle.

15. A lifting device for a vehicle, comprising a member having openings formed therein, a lifting jack mounted in said openings and having means of greater size than said openings and means for drawing said means longitudinally against said member for securing said jack in position.

ALBERT C. HOECKER.